(12) United States Patent
Winterot et al.

(10) Patent No.: US 7,259,911 B2
(45) Date of Patent: Aug. 21, 2007

(54) TRINOCULAR TUBE FOR STEREO MICROSCOPES

(75) Inventors: Johannes Winterot, Jena (DE); Johannes Knoblich, Jena (DE); Hanna Tielebier, Quitzoebel (DE); Guenter Osten, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 229 days.

(21) Appl. No.: 10/988,380

(22) Filed: Nov. 12, 2004

(65) Prior Publication Data

US 2005/0105175 A1    May 19, 2005

(30) Foreign Application Priority Data

Nov. 14, 2003   (DE) ................ 103 54 010

(51) Int. Cl.
*G02B 23/00*   (2006.01)
(52) U.S. Cl. .............. 359/431; 359/376; 359/368; 359/836
(58) Field of Classification Search ............ 359/374
See application file for complete search history.

(56) References Cited

U.S. PATENT DOCUMENTS 4,597,644 A * 7/1986 Schindl .............. 359/363

FOREIGN PATENT DOCUMENTS

| DE | 26 54 778 | 6/1978 |
|---|---|---|
| DE | 35 08 306 | 9/1986 |
| DE | 37 18 843 | 12/1987 |

* cited by examiner

*Primary Examiner*—Stephone B. Allen
*Assistant Examiner*—Derek S. Chapel
(74) *Attorney, Agent, or Firm*—Reed Smith LLP

(57) ABSTRACT

A trinocular tube for stereo microscopes with an inclined binocular eyepiece whose angle can be adjusted and with two stereo microscope beam paths. The trinocular tube includes, in the beam paths, a first tube unit which can be connected to the body of the stereo microscope. A connection piece for cameras is arranged at the first tube unit. A second tube unit is arranged at the first tube unit so as to be swivelable around an axis and which is connected to an eyepiece tube unit that is swivelable around the optical axis of the respective beam path. The trinocular tube also includes a roof mirror, a deflecting element and an optical axis that is swivelable around a second swiveling axis.

3 Claims, 3 Drawing Sheets

TRINOCULAR TUBE FOR STEREO MICROSCOPES

CROSS-REFERENCE TO RELATED APPLICATION

This application claims priority of German Application No. 103 54 010.5, filed Nov. 14, 2003, the complete disclosure of which is hereby incorporated by reference.

BACKGROUND OF THE INVENTION a) Field of the Invention

The invention is directed to a trinocular tube which can be adjusted in a desired manner within a determined angular area to achieve ergonomically favorable viewing angles in the eyepiece.

b) Description of the Related Art

When observing and documenting objects through a stereo microscope, it is desirable that the angle of inclination of the inclined binocular eyepiece can be adjusted as desired within a limited swiveling area in order to realize an ergonomically favorable viewing angle in the eyepiece.

DE 26 54 778 and DE 37 18 843, as well as brochures and sales literature by Nikon, Leica and Meiji, disclose swivelable binocular tubes for stereo microscopes which allow an ergonomically favorable viewing angle to be adjusted, but which do not have an integrated connection piece, e.g., for cameras for photographing objects. These brochures include the P-BERG and SMZ "swivelable binoculars" by Nikon, the "ErgoTube" 10 445 822 by Leica, and the "ErgoBinocular head" MA 749 by Meiji.

However, stereo microscope tubes with integrated connection pieces for cameras have only one tube with a fixed, non-adjustable eyepiece viewing angle. Examples of such stereo microscope tubes include the SZX-Tr30 "Trinocular Tube" by Olympus, the 50% "Trinocular Video/Photo Tube" 10 445 924 and the 100% "Trinocular Video/Photo Tube" 10 446 229 by Leica.

Also, DE 35 08 306 describes the possibility of deflecting the beam path to a connection piece for cameras also for standard microscopes without a stereo beam path. For this purpose, the defection is carried out by means of a mirror which can be added to and removed from the respective beam path and which is arranged in front of the tube optics and in front of the deflecting element for adjusting the viewing angle.

OBJECT AND SUMMARY OF THE INVENTION

It is the primary object of the invention to provide a trinocular tube for stereo microscopes with an adjustable, inclined binocular view into the eyepiece in which at least one of the two stereo microscope beam paths can be introduced into a camera connector in any position of the inclined eyepiece in a simple manner.

According to the invention, this object is met in a trinocular tube for stereo microscopes with an inclined binocular eyepiece whose angle can be adjusted and with two stereo microscope beam paths comprising, in these beam paths, a first tube unit which can be connected to the body of the stereo microscope. A connection piece for cameras is arranged at the first tube unit. A second tube unit is arranged at the first tube unit so as to be swivelable around an axis and which is connected to an eyepiece tube unit that is swivelable around the optical axis of the respective beam path. A roof mirror is arranged in each stereo microscope beam path, which roof mirror reflects the entering light beams toward the respective eyepiece tube unit. A deflecting element is provided in at least one of the stereo microscope beam paths of the trinocular tube and is rigidly connected to a roof mirror with an open roof edge in a holder that is swivelable around a second swiveling axis. The optical axis of the beam path that impinges on the deflecting element which is swiveled into the at least one beam path lies in a plane in which the optical axis of the stereo microscope beam path impinging on the first mirror of the roof mirror with open roof edge is also located.

The trinocular tube, according to the invention, enables visual observation of the object and photographic or digital recording of the object simultaneously in a stereo microscope.

It is also advantageous when the deflecting element is introduced into the at least one beam path of the stereo microscope for deflecting the at least one stereo microscope beam path into the connection piece for cameras.

The invention is realized in a simple, economical manner when the swiveling axis of the holder and the axis around which the second tube unit, together with the eyepiece tube units, is swivelable extend parallel to one another and are arranged separately from one another in the first tube unit.

The invention realizes for the first time a trinocular tube with an inclined binocular eyepiece whose angle of inclination can be adjusted or changed as desired within a limited swiveling area and with a deflecting element which can be switched into a stereo channel in a simple manner and which deflects the beam path of this stereo channel at every possible angle of inclination either into the inclined binocular eyepiece which is adjustable with respect to the angle of inclination or into the connection piece for video cameras, digital cameras or photographic cameras. This solution is particularly advantageous for the user because both of the functions mentioned above can be combined in one stereo microscope without the need for an additional tube.

The invention will be described more fully in the following with reference to an embodiment example.

DESCRIPTION OF THE PREFERRED EMBODIMENTS

In the description of the embodiment example, all of the elements of one beam path of the stereo microscope are designated by a number with the letter 'a' and the elements of the second beam path are designated by a number with the letter 'b'.

Figure 1:
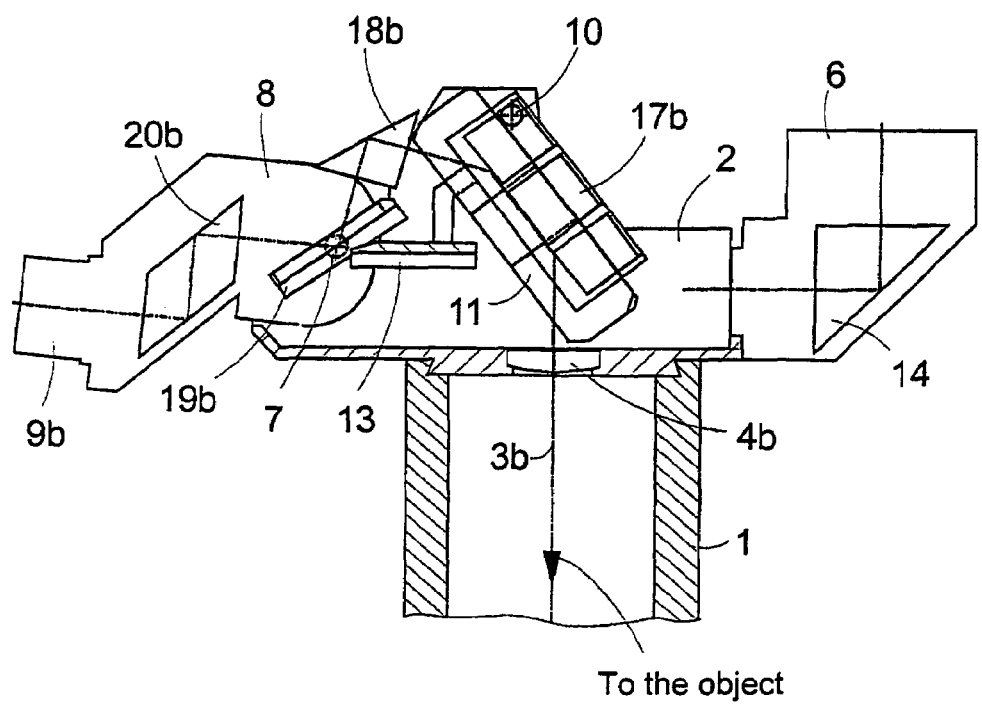
FIG. 1 shows an embodiment form for binocular, stereo-microscopic observation with a swivelable holder for mirrors.
Figure 2:
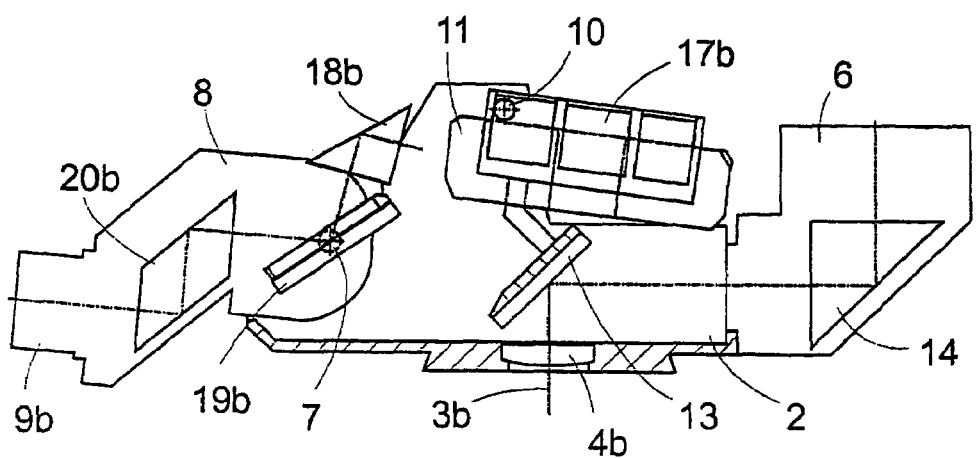
FIG. 2 shows an embodiment form with a swivelable holder for mirrors with deflected stereo beam path.
Figure 3:
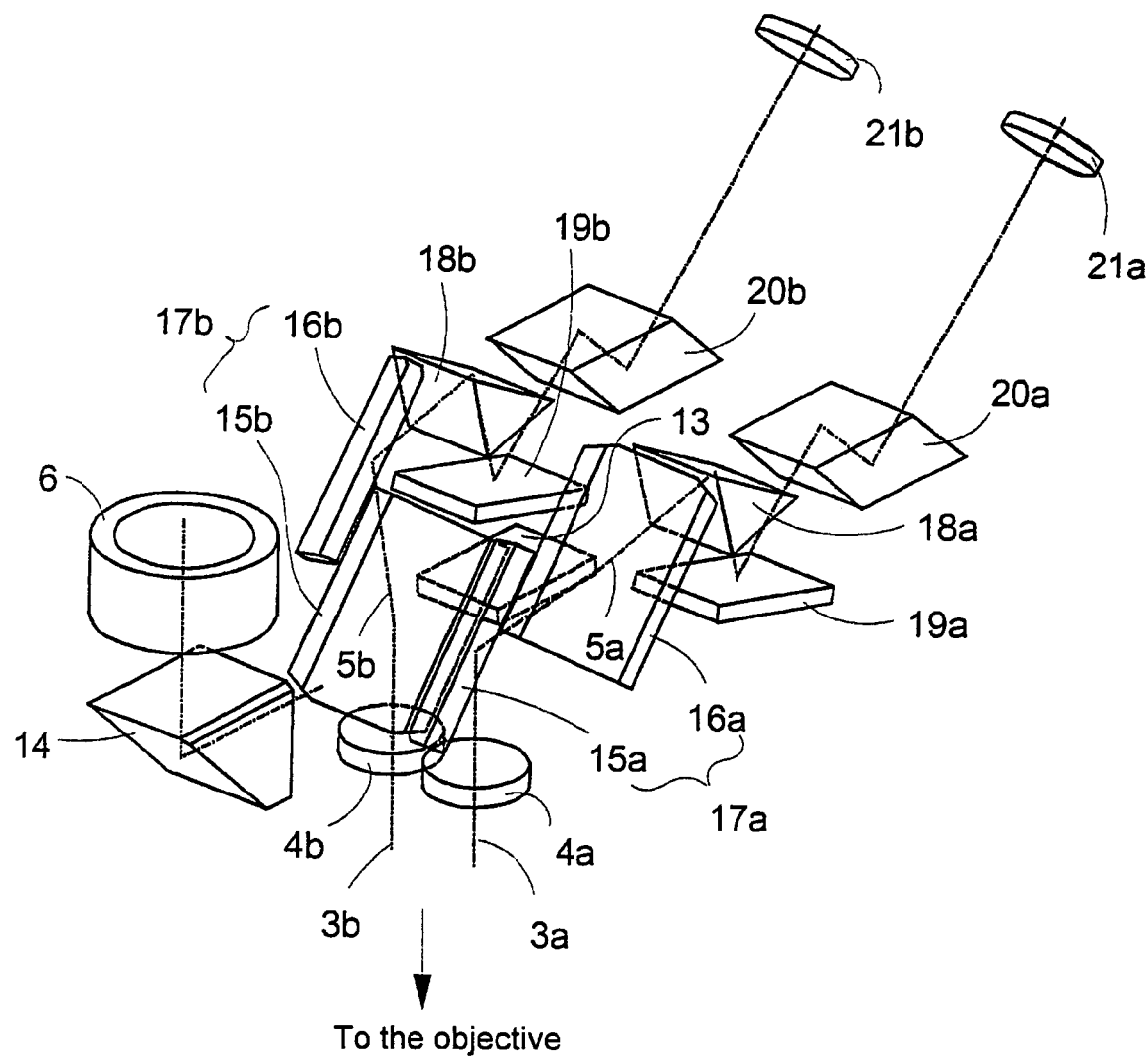
FIG. 3 shows the position of the optical element of the trinocular tube during binocular observation.
Figure 4:
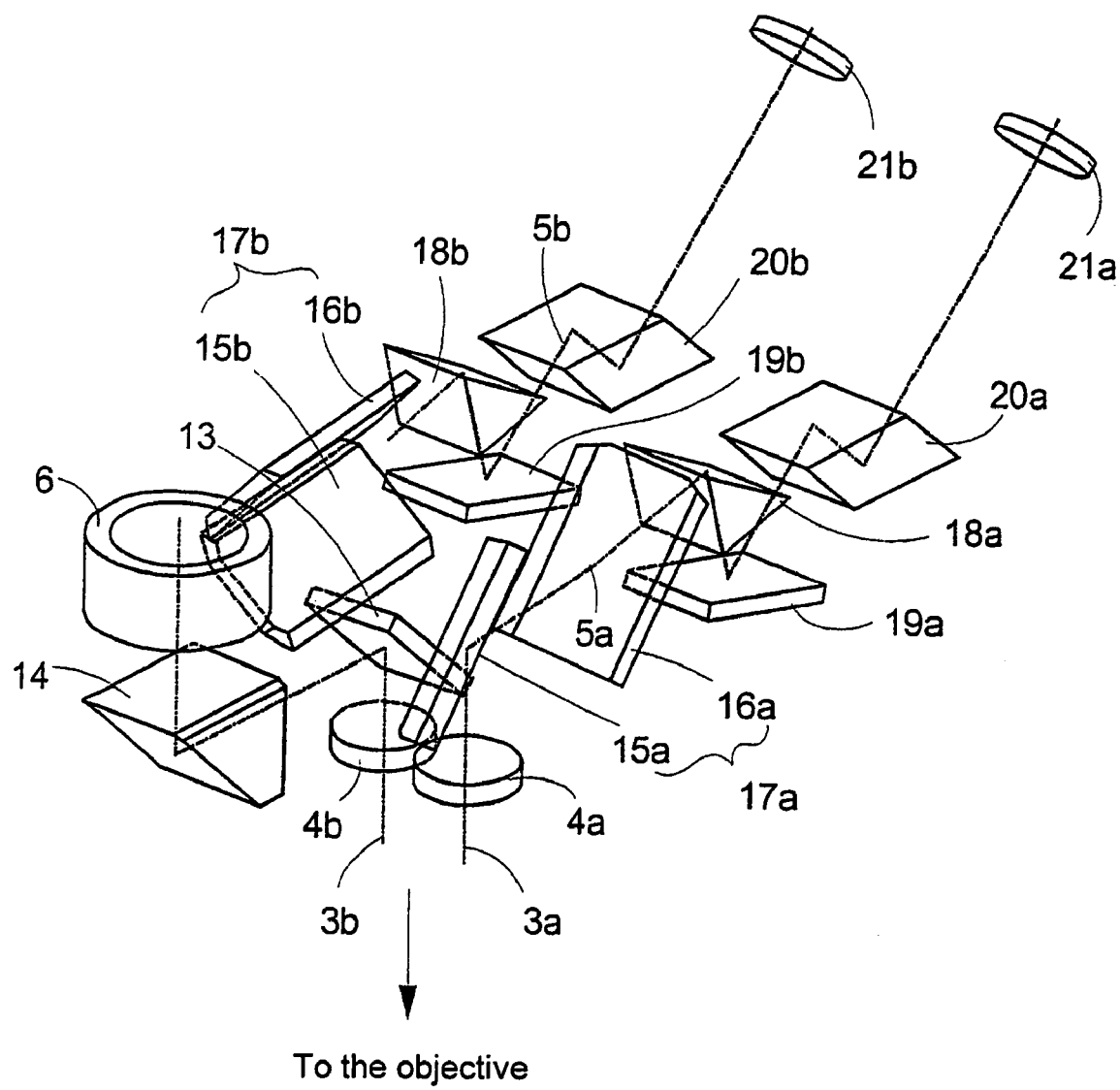
FIG. 4 shows the position of the optical element of the trinocular tube when a stereo beam path is diverted into a connection piece for cameras.

FIGS. 1 and 2 show the basic construction of the trinocular tube, according to the invention, in the various function positions. As can be seen from FIG. 1, a first tube unit 2 is connected, preferably in an exchangeable manner, with a body 1 of a stereo microscope. In this first tube unit 2, the two stereo microscope beam paths 3a and 3b (FIGS. 3 and 4) which come from the objective (not shown) and whose optical axes are designated by 5a and 5b in the drawings are introduced through an imaging lens 4a and 4b, respectively (FIGS. 3 and 4). A connection piece 6 for attaching a camera or other recording device is provided at the first tube unit 2 in one of the two beam paths, beam path 3b in the embodiment example. A first swiveling axis 7 is likewise provided in the tube unit 2, a second tube unit 8 being mounted so as to be swivelable around this first swiveling axis 7. An eyepiece tube unit 9a and 9b, with which a beam path 3a and 3b is associated, respectively, is arranged at this second tube unit 8 so as to be rotatable around the respective optical axis 5a, 5b for the purpose of adjusting to the interpupillary distance of the user. The eyepiece tube unit 9a is not visible in FIGS. 1 and 2 because it lies behind the eyepiece tube unit 9b in FIGS. 1 and 2.

Further, a holder 11 which is swivelable around a second swiveling axis 10 is provided in the first tube unit 2 in at least one of the beam paths 3a or 3b, beam path 3b in the embodiment example. A roof mirror 17b comprising two mirrors with an open roof edge and a deflecting element 13 in the form of a mirror or a deflecting prism are arranged at the holder 11 in a fixed spatial relationship to one another.

A deflecting prism 14 which deflects the camera beam path by 90° is advantageously provided in the connection piece 6.

FIG. 1 shows the position of the holder 11 with the roof mirror 17b and the deflecting element 13 for stereoscopic viewing. FIG. 2 shows the position of the holder 11 when one of the stereo microscope beam paths 3b is introduced into the connection piece 6 by the deflecting element 13.

FIGS. 3 and 4 show the basic construction of the optical system of the trinocular tube in the two function positions. The stereo microscope beam paths 3a and 3b coming from the body 1 of the microscope pass through the imaging lenses 4a and 4b.

FIG. 3 shows the optical beam path of the stereo microscope in visual stereoscopic observation. As can be seen, the beam path 3a successively strikes the elements 15a and 16a of a roof mirror 17a with open roof edge and is guided by a right-angle prism 18a and a rotating mirror 19a, depending on the angle of inclination of the second tube unit 8, into the eyepiece 21a of one beam path 3a of the stereo microscope by a rhomboid prism 20a which is arranged in the tube unit 8.

The beam path 3b successively strikes the elements 15a and 15b of a second roof mirror 17b with open roof edge and is guided by a second right-angle prism and another rotating mirror 19b, depending on the angle of inclination of the second tube unit 8, into the eyepiece 21b of the second beam path 3b of the stereo microscope by another rhomboid prism 20b which is likewise arranged in the tube unit 8.

In this arrangement of the individual optical elements, an upright, laterally correct image of the object is observed in the two eyepieces 21a and 21b. In the position of the two roof mirrors 17a and 17b with open roof edge shown in FIG. 3, no light is introduced into the connection piece 6 by the deflecting prism 14.

FIG. 4 shows the position of the individual optical elements when one of the stereo microscope beam paths, beam path 3b in the embodiment example, is introduced into the connection piece 6 for the purpose of imaging the object through a camera (not shown) arranged at the connection piece 6. The design of the one stereo microscope beam path 3b and the position of the optical element of this beam path 3b are the same as in the arrangement described in connection with FIG. 3. The elements 15b and 16b of the roof mirror 17b are removed from the beam path 3b and the deflecting element 13 is simultaneously swiveled into the beam path 3b in order to introduce this beam path 3b into the connection piece 6 by swiveling the holder 11 around the second axis 10.

In this way, in a stereo microscope with an inclined binocular eyepiece whose angle of inclination can be adjusted or changed optionally within a defined swiveling area, it is made possible by the trinocular tube according to the invention with the deflecting element 13 which can be switched into the microscope beam path in a simple manner that the object can be visually observed in one beam path 3a and simultaneously photographed in the other beam path 3b regardless of the angular position of the inclined binocular eyepiece. Accordingly, both functions can be combined in one stereo microscope tube.

While the foregoing description and drawings represent the present invention, it will be obvious to those skilled in the art that various changes may be made therein without departing from the true spirit and scope of the present invention.

REFERENCE NUMBERS 1 body
2 first tube unit
3a, 3b beam path
4a, 4b imaging lens
5a, 5b optical axis
6 connection piece
7 first swiveling axis
8 second tube unit
9a, 9b eyepiece tube unit
10 second swiveling axis
11 holder
13 deflecting element
14 deflecting prism
15a, 15b element
16a, 16b element
17a, 17b roof mirror
18a, 18b right-angle prism
19a, 19b rotating mirror
20a, 20b rhomboid prism
21a, 21b eyepiece

What is claimed is:

1. A trinocular tube for stereo microscopes with an inclined binocular eyepiece whose angle can be adjusted and with two stereo microscope beam paths, comprising in said beam paths:

a first tube unit which can be connected to the body of the stereo microscope;

a connection piece for cameras being arranged at the first tube unit;

a second tube unit being arranged at the first tube unit so as to be swivelable around an axis and which is connected to an eyepiece tube unit that is swivelable around the optical axis of the respective beam path;

a roof mirror arranged in each stereo microscope beam path, which roof mirror reflects the entering light beams toward the respective eyepiece tube unit;

a deflecting element being provided in at least one of the stereo microscope beam paths of the trinocular tube and is rigidly connected to a roof mirror with an open roof edge in a holder that is swivelable around a second swiveling axis; and wherein the optical axis of the beam path that impinges on the deflecting element which is swiveled into the at least one beam path lies in a plane in which the optical axis of the stereo microscope beam path impinging on a first mirror of the roof mirror with open roof edge is also located.

2. The trinocular tube according to claim 1, wherein the deflecting element is arranged so that it is switched into the at least one beam path in order to deflect the at least one stereo microscope beam path into the connection piece for cameras.

3. The trinocular tube according to claim 1, wherein the second swiveling axis of the holder and the first swiveling axis around which the second tube unit is swivelable together with the eyepiece tube units extend parallel to one another and are arranged separately from one another in the first tube unit.

* * * * *